No. 805,591. PATENTED NOV. 28, 1905.
L. A. DAVISON & J. M. LOGAN.
NON-PUNCTURABLE TIRE.
APPLICATION FILED JUNE 8, 1905.

Witnesses:
George Mortson
Frank S. Chester

Inventors:
Luther A. Davison.
James M. Logan.
By their Atty.
Ed. E. Claussen

UNITED STATES PATENT OFFICE.

LUTHER A. DAVISON AND JAMES M. LOGAN, OF HARTFORD, CONNECTICUT.

NON-PUNCTURABLE TIRE.

No. 805,591.      Specification of Letters Patent.      Patented Nov. 28, 1905.

Application filed June 8, 1905. Serial No. 264,276.

*To all whom it may concern:*

Be it known that we, LUTHER A. DAVISON and JAMES M. LOGAN, citizens of the United States, residing at Hartford, in the county of Hartford and State of Connecticut, have invented certain new and useful Improvements in Non-Puncturable Tires, of which the following is a full, clear, and exact specification.

This invention relates to vehicle-tires adapted to be used on automobiles, motor-cycles, bicycles, carriages, or any other wheeled vehicle; and the object of this invention is to provide a tire which is absolutely non-puncturable, retaining at the same time all salient and desirable features of the pneumatic tire now in use—that is, lightness and resilience—but dispensing with the disadvantage of inflating the tire and obviating the liability of puncturing, which is the principal source of trouble of the pneumatic tire.

The object of this invention is to improve the tire by filling up the exterior tube or casing, which is made of rubber or any other similar suitable material, with a series of short cork cylinders or washers.

Figure 1:
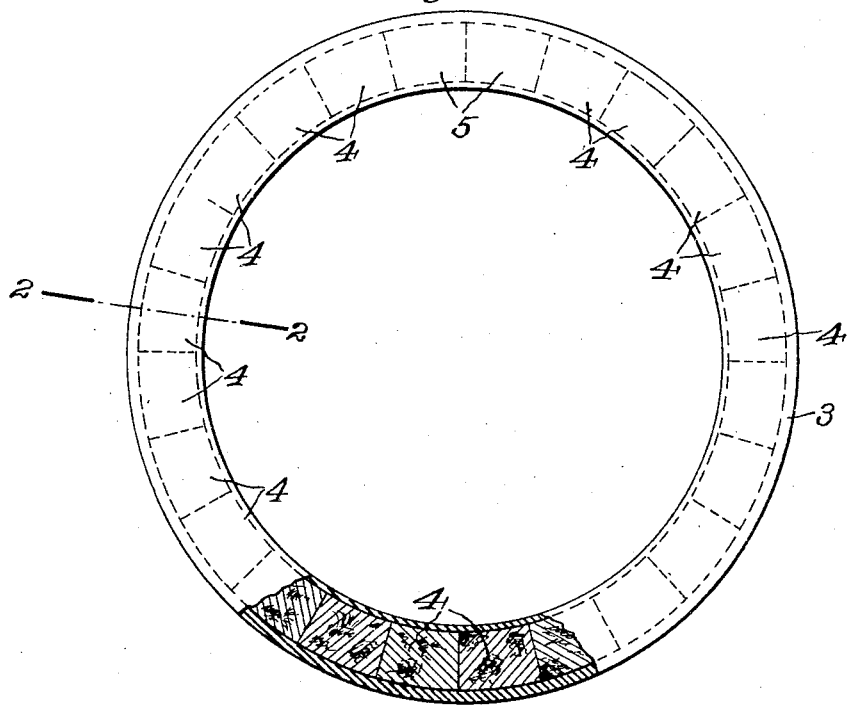
Figure 2:
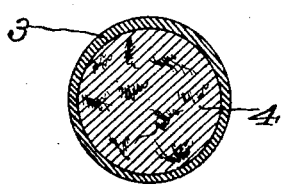

In the accompanying drawings, Figure 1 represents a side elevation of our improved tire having a part of the outer casing removed to show the inner filling. Fig. 2 is a cross-sectional view on line 2 2 of Fig. 1.

Referring to the drawings of our improved non-puncturable tire, the numeral 3 designates the exterior tubular cover or casing, which may be rubber, canvas, or any other suitable material well known in the art, and having an interior chamber, which is compactly filled with a series of short cylindrical cork sections or washers 4. The faces of these cork cylinders are provided with cement, so that when they are compactly placed in the tire they form one closely and firmly united mass.

The numerals 5 5 indicate rubber plugs or washers similar in section, as the cork cylinders, which are inserted into the tire for the purpose of vulcanizing the tire.

In manufacturing our improved non-puncturable tire we use the same methods and molds as are now used in the manufacture of rubber tires except that the ends are left open. The rubber tire is then firmly packed with the cork washers, having prior to their insertion the faces coated with a cement or glue. The last plugs inserted at either end of the rubber tube are the plugs 5 5, and then the tire is placed back into the vulcanizer and vulcanized together, thus completing the tire.

It is obvious that a tire of the character just described can be made cheaper than the pneumatic tire now in use, as the inner layer of rubber, which is necessary in the pneumatic tire, can be dispensed with altogether.

Having thus described our invention, what we claim as new, and desire to secure by Letters Patent, is—

1. In a non-puncturable tire the combination of an exterior cover provided with an interior chamber, a series of cylindrical cork sections compactly placed within the interior chamber, the rubber plugs 5 forming the end sections and vulcanized together and to the tire.

2. In a non-puncturable tire the combination of the tubular cover 3, the cylindrical cork sections 4 firmly united and within the tubular cover, the rubber plugs 5 forming end sections within the tubular cover and vulcanized together and to the tubular cover.

Signed at Hartford, Connecticut, this 7th day of June, 1905.

LUTHER A. DAVISON.
            JAMES M. LOGAN.

Witnesses:
     SIDNEY E. CLARKE,
     BELLE G. RUSSELL.